United States Patent [19]

Reid

[11] 3,888,131

[45] June 10, 1975

[54] COVERING FOR BELT CONVEYOR IDLER ROLLS

[75] Inventor: Charles M. Reid, Calgary, Alberta, Canada

[73] Assignee: Elast-O-Cor Products & Engineering Limited, Alberta, Canada

[22] Filed: Oct. 5, 1973

[21] Appl. No.: 404,003

[30] Foreign Application Priority Data

Oct. 23, 1972 Canada .................... 154596

[52] U.S. Cl. ............................................. 74/241
[51] Int. Cl. ............................................. F16h 7/18
[58] Field of Search ...... 74/241, 240; 198/202, 230, 198/192

[56] References Cited
UNITED STATES PATENTS

| | | | |
|---|---|---|---|
| 2,622,448 | 12/1952 | Lorig | 74/241 |
| 2,772,879 | 12/1956 | Lorig | 74/241 X |
| 3,273,696 | 9/1966 | Thurston | 74/241 X |
| 3,713,348 | 1/1973 | Conrad et al. | 74/240 |
| 3,744,329 | 7/1973 | Frank | 74/241 |
| 3,772,931 | 11/1973 | Conrad et al. | 74/240 |

*Primary Examiner*—Leonard H. Gerin
*Attorney, Agent, or Firm*—Spencer & Kaye

[57] ABSTRACT

The present invention provides a belt conveyor idler roll surface having thereon a pair of opposed helical ribs, each of the ribs spiralling around the roll surface a plurality of times so as to provide said surface with a pair of screw thread-like formations extending substantially the full length of the roll. The ribs are dimensioned and proportioned in predetermined fashion and made from a material which is sufficiently flexible as to permit the ribs to be deflected and released in a continuous cyclic fashion due to contact of the belt surface with the threads whereby to provide a self-cleaning action. The roller is also provided with a means at mid-length which divides or separates the two spirals. In the preferred form of the invention the roll surface is formed of a polyurethane elastomer which provides the necessary flexibility coupled with excellent abrasion resistance.

13 Claims, 5 Drawing Figures

COVERING FOR BELT CONVEYOR IDLER ROLLS

This invention relates to belt conveyor idler rolls, particularly self-cleaning idler rolls for supporting belt conveyors adapted to convey fine granulated materials.

It is well known that certain types of granular materials create serious problems in belt conveyors as a result of the granular material adhering to and building up in the form of mounds on the surfaces of the idler rolls. This problem has been found to be particularly acute when conveying oil or tar bearing sands due to the exceptional tendency of these sticky sands to cling to whatever surfaces they contact regardless of the materials of construction used (including rubber and steel). As a result it has been found necessary to discontinue the use of plain smooth faced steel rollers altogether. Other designs have been tried as well but with only a limited degree of success. One design employing a plurality of rubber rings stacked on a steel hub and held together tightly with washers and lock rings caused a major reduction in build-up problems but tended to wear out rapidly.

The present invention provides a belt conveyor idler roll surface having thereon a pair of opposed helical ribs, each of the ribs spiralling around the roll surface a plurality of times so as to provide said surface with a pair of screw thread-like formations extending substantially the full length of the roll. The ribs are dimensioned and proportioned in predetermined fashion and made from a material which is sufficiently flexible as to permit the ribs to be deflected and released in a continuous cyclic fashion due to contact of the belt surface with the threads whereby to provide a self-cleaning action. The roller is also provided with a means at mid-length which divides or separates the two spirals. In the preferred form of the invention the roll surface is formed of a polyurethane elastomer which provides the necessary flexibility coupled with excellent abrasion resistance.

The various features and advantages of the invention will be apparent from the following description of preferred embodiments of the invention, reference being had to drawings wherein.

Figure 1:
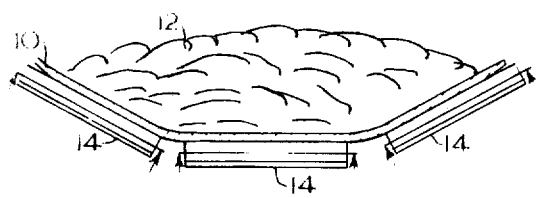
FIG. 1 is a diagrammatic cross-sectional view of a troughed conveyor belt supported on a plurality of idlers having surfaces according to the present invention.

FIG. 1 shows a belt conveyor including a wide conveyor belt 10 which supports a load of tar sand 12. The belt is supported in a troughed configuration by means of groups of idlers 14 spaced apart along the length of the conveyor in the manner well known in the art, each group comprising a horizontal center idler 14 flanked by a pair of inclined side idlers. The support frames for the idlers are not shown as frames of that nature are well known in the art.

Each idler 14 comprises an elongated, hollow cylindrical metal shell, having circular end caps 16 welded thereto with an elongated shaft 18 passing axially through the shell and through the end caps 16. The outwardly projecting ends of shaft 18 are, of course, journalled in suitable bearings mounted in the above mentioned support frames.

The metal shell is provided with a cylindrical sleeve 20 constructed in accordance with the present invention. The sleeve must be made of a flexible, abrasion resistant material. The surface of the sleeve has thereon integrally formed spiral ribs 22, each rib extending around the sleeve 20 a large number of times in the form of a helix. The sleeve actually includes two separate spiral ribs 22a, 22b separated mid-way along the length of the sleeve by a mid-length divider groove 26 which extends completely around the sleeve itself, with the helical formation defined by rib 22a being of opposite hand to the helix defined by rib 22b. Opposed helical grooves 28a, 28b are thus defined by the spiral ribs 22a, 22b respectively.

The present invention of an idler roll having a surface including flexible opposed spiral ribs 22 with a groove 26 or other suitable means at mid-length dividing the two spiral ribs 22a, 22b is advantageous in many ways.

The spiral ribs 22 provide for distribution of belt load 12 onto several points of loading at any one instant so as to assist in preventing the compression and flattening of tar-sand lumps thereby keeping their contact surface areas from increasing substantially and hence reducing the tendency of the lumps to stick to the roller 14.

The spiral ribs 22 provide continuous re-distribution of the point loads with respect to the belt 10. If, for example, in any one revolution of the roller 14, the load and its momentum did not prevent belt 10 from being shifted laterally by the action of the spiral ribs, (i.e. perpendicular to its direction of motion), it would be shifted laterally a distance equal to the lead of the spiral rib 22. With the belt laterally restrained, there is relative motion of the belt surface with respect to the spiral rib 22 in a direction opposite to that of the lead. This motion results in continuous re-distribution of the point loads across the belt 10. As a consequence of this relative motion there is a tendency for the spiral ribs 22 to be deflected in a lateral direction on contact with the belt 10 at any instant. This continuous deflection-release-deflection cycle in the crest and sides of each spiral rib 22 tends to shake loose small tar-sand particles before they can stick and accumulate in the helical grooves 28 or on the sides of each rib 22.

The relative motion described above is also advantageous with respect to the cleaning or scraping of the underside of the belt 10. It is well known that a dirty belt can cause many problems in a conveyor system. This scraping tends to dislodge and break up any lumps on the belt surface.

The helical grooves 28a, 28b between adjacent ribs 22 provide a continuous route along which sticky tar-sand accumulations can be gradually pumped or squeezed in the direction of the leads of the spiral ribs 22 by the continuous deflections in the ribs with said accumulations being eventually ejected at the ends of the helical grooves.

Since the spiral ribs 22 on opposing sides of the mid-length divider groove 26 have opposing leads, the tar-sands will either move along the helical grooves 28a, 28b toward the centre of the roll or alternatively away from the centre and towards the opposing ends of the roller 14 depending on the direction of rotation of the roller. As the ends of and supports for the roll 14 are identical and symmetrical, each roller can be reversed end for end in which event the direction of rotation of the roller will be reversed. The sleeve 20 will self clean in either direction of rotation, this being an important factor to those persons installing or replacing rolls for obvious reasons. In order to avoid any obstruction of these helical grooves, the mid-length divider groove 26 (which could also be described as a gap or separation between the ends of the opposing helical ribs 24) is at least as deep as said helical grooves 28a, 28b.

If the mid-length divider groove or gap were omitted and the ends of the helical ribs 24a, 24b allowed to contact and support each other, a loss of flexibility would result and an obstruction would be created at the point at which the two threads met. This would create a trap for the tar-sands to accumulate. This was proven in early tests wherein a mid-length divider groove or separation was not used with permanent tar-sands accumulations between the helical ribs being the result. In the arrangement according to the invention, the tar sands, after having been pumped along the helical grooves 28a, 28b to either the roll centre, or the roll ends, exit from between the ribs and are eventually flung off the roll by centrifugal force. The tar-sands, being forced to continually move along, do not have a chance to accumulate and build-up into a permanent deposit or lump.

Because there is a tendency for a uni-directional spiral rib to shift the belt 10 laterally, the use of opposed spirals or helices 24a, 24b on opposing halves of each roller also serves to prevent untracking of the conveyor belt 10.

Each rib 22, in cross section, is of generally inverted V-shape with a somewhat rounded crest. Design data for a typical embodiment is given hereinafter.

An embodiment of the invention has been described in general terms. A more detailed discussion of the various factors, which on the basis of numerous tests appear to be of significance, is given below.

In designing a troughing idler for a fast moving (e.g. 1000 ft/min) conveyor belt, 5 ft. or 6 ft. wide designed to carry a maximum of 10,000 tons of tar-sand per hour from a mine the tremendously wide variations in loads, side thrusts, speeds, temperatures, viscosities of bitumen in the tar-sand and tar-sand particle sizes had to be considered.

After numerous trials a practical design was found which works under conditions apt to be encountered. In cases where the idlers are subjected to only light loads, as at transfer points where the belt barely touches the idler rollers, it has been found that tar-sand build-up in the grooves 28 occurs indicating that there has not been enough flexing of the spiral ribs 22. Thus, it follows that efforts should be made to ensure as uniform a loading for the idler rollers as possible to ensure a proper cleaning action.

For practical reasons it is not generally desirable to use different rib dimensions etc. in the same conveyor system to meet all the various extreme conditions that might be encountered because the operator may have a very large number of idlers e.g. some 10,000 idlers or more, and the use of more than one type increases the problem of maintenance; furthermore, conveyors of this type are extended and relocated at regular intervals as mining progresses using sections of framework each typically containing 18 idlers. However, in some operations it may be possible to use various spiral rib designs to suit the particular variables encountered such as loading, particle size etc.

Figure 3:
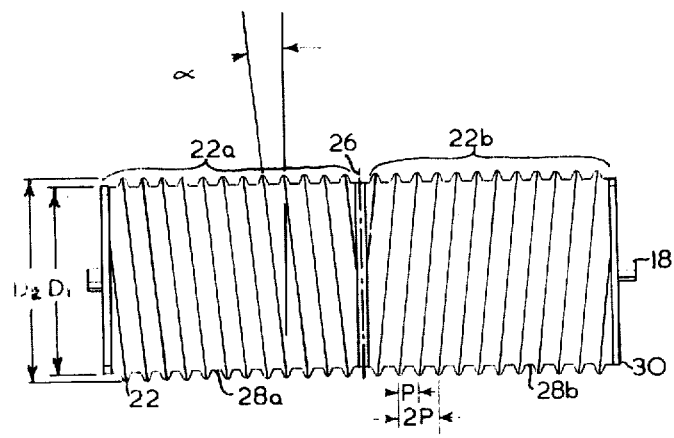
FIG. 3 is a view approximating that of FIG. 2 but including references to certain design parameters.
Figure 4:
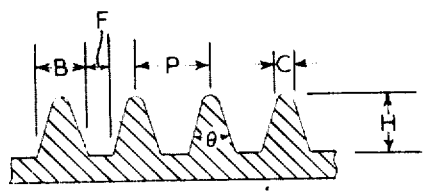
FIG. 4 is a section view of the helical ribs including references to certain design parameters.
Figure 5:
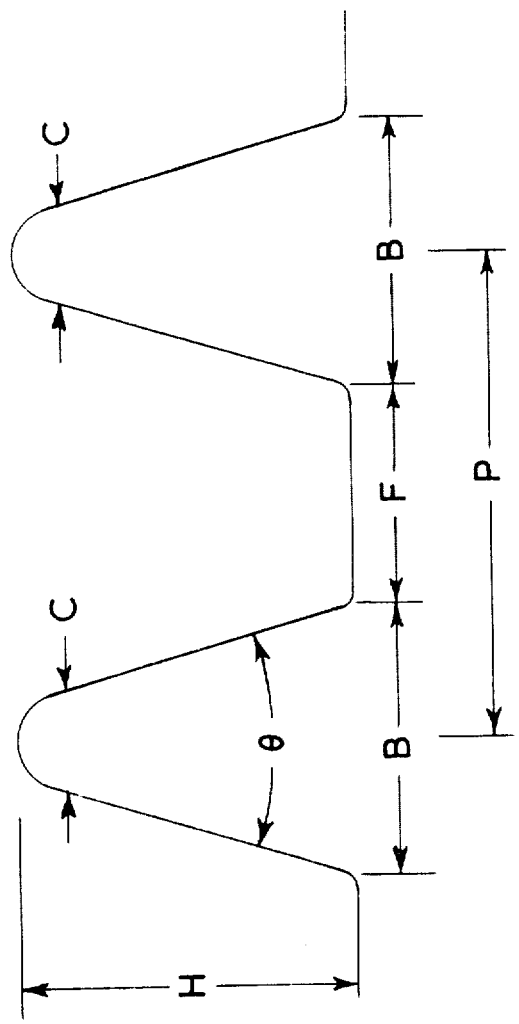
FIG. 5 is an enlarged section view corresponding to that of FIG. 4.

The following table summarizes design data for typical designs according to the invention. The ratios in question will be apparent from FIGS. 3–5 and the definitions given following the table.

TABLE 1

| Test No. | Design No. | H/C | F/C | B/C | P/C | θ | H/B | $D_2$ (in) | α (°) | Shore Hardness of Material |
|---|---|---|---|---|---|---|---|---|---|---|
| G | 5 | 3.5 | 2.2 | 2.8 | 5 | 33°24' | 1.25 | 7.5 | 3° | 50D |
| F | 4 | 4 | .96 | 3.04 | 4 | 33°24' | 1.32 | 7.5 | 2½° | 50D |
| E | 4 | 4 | 4.95 | 3.04 | 8 | 33°24' | 1.32 | 7.5 | 5° | 50D |
| C | 2 | 4 | 1 | 4 | 6 | 41°06' | 1.00 | 7.5 | 3½° | 90A |

Design Parameters

C = Crest Width (Reference)—(Round Semi-Circular crest)
H = Groove Depth or Height of Rib
F = Flat Root Width
B = Base of Rib Width
P = Pitch of Spiral Rib
θ = Included Angle Between Sides H/B = $\frac{\text{Height of Rib}}{\text{Width of Rib Base}}$ at any given value of C, the crest width $D_1$ = Minor Diameter, outside
$D_2$ = Major Diameter, outside
α = Lead Angle of Rib around outside, i.e., angle spiral rib makes with a plane perpendicular to roller axis or direction of belt motion.
In all of the above tests, the entire sleeve 20 was made from fully cured polyurethane elastomer having the Shore hardness values given in the table.

The crest width, C of the spiral rib 22, may be taken as a reference. It is generally taken as the minimum practical dimension for a semicircular or rounded crest when molding the above mentioned polyurethane elastomer in a rib profile of this size. Values of C between 0.100 inch and 0.250 inch should meet the load bearing needs of most conveying systems.

For flexibility it has been found that the ratio of the rib height to the base of rib width, (H/B) should be preferably equal to or greater than unity when C is between 0.100 inch and 0.250 inch with the polyurethane elastomer having a Shore hardness between 85A and 55D.

It should be noted that the pitch of the spiral rib 22 (P) is equal to the base width (B) plus the flat-root width (F). If P is constant and B is decreased so as to increase H/B for greater flexibility then F is increased by the same length that B is decreased. In cases where the polyurethane elastomer sleeve 20 is bonded to the steel shell the root is hardly influenced (flexed) by the flexing of the ribs 22 and it was noticed that when tarsand build-up begins it is usually on the surface of the flat-root. If F is too small it may tend to trap large lumps. For practical purposes, F should be between 0.75C and 3 C for values of C between 0.1 inch and 0.25 inch.

The pitch, (P) and angle $\alpha$ are related by the relationship Tan $\alpha = P/\pi D_2$ for a single helical rib. Increase of $\alpha$ beyond 5° is not recommended because this means that; (i) the frictional resistance force to belt motion increases with increase in $\alpha$ and this increases belt power requirements and, (ii) increased $\alpha$ at constant $D_2$ means increased P which increases the flat-root F and its surface area for the same values of H and B.

Two factors suggest that increasing $\alpha$ above 5° is not necessary in order to get the required degree of lateral flexing in the spiral ribs 22:

a. the presence of sufficient intermittent side thrusts, either inherent in the conveyor design or caused by uneven loading and, b. the friction force caused by the relative motion or scraping described above.

If more flexing of the spiral rib 22 is required the ratio H/B can be increased, rather than increasing $\alpha$.

The choice of material for the sleeve 20 and its integrally formed spiral ribs 22 influences the degree of rib flexing; thus for any given thread design the degree of flexibility can be varied by the choice of one of a number of polyurethane elastomer compounds from which the covering can be cast. For example, the tensile strengths of two typical polyurethane elastomer compounds of 85 A and 55 D Shore hardness are 4500 psi. and 8800 psi. respectively. Thus for the same H/B ratio the latter compound (harder) would deflect much less under similar loading. Conversely to get the same deflection in a rib of 55 Shore hardness material as in a rib of 85 A Shore hardness material the H/B ratio would need to be increased for the 55 (harder) material.

Figure 2:
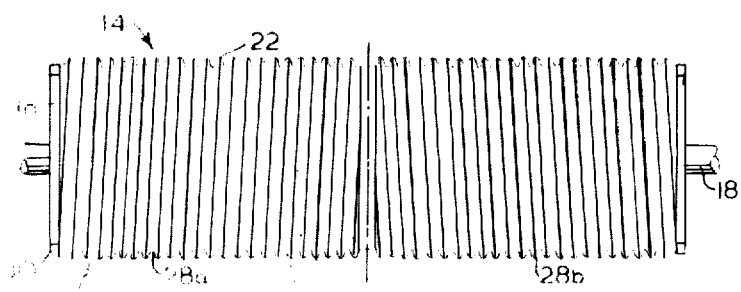
FIG. 2 is a side elevation view of an idler roll having a surface according to the invention.

Other design factors worthy of mention are given below:

i. Experience indicates the range of F should be between 0.75 C and 3 C. A more simple rule of thumb is to make F larger than the anticipated average size of ore particle or agglomerate of ore particles and/or smaller than the thread height (H) to avoid the lodging of particles between sides of adjacent threads.

ii. The spiral ribs 22 can have single or multiple lead;

iii. The sleeve 20 can be (a) hot-bonded to the metal shell; (b) slipped-on and cold-bonded in place with end rings such as end rings 30 (FIGS. 2 and 3); or (c) held in place with end rings 30 and screws threaded through sleeve 20 and into the wall, of the steel shell. It has been found that (b) incurs the lowest production cost and stands up well under the most severe loading;

iv. The covering should be reasonably symetrical and concentric relative to the degree of vibration that can be tolerated;

v. The minimum width of the mid-length divider groove 26 measured axially need only be as wide as the groove F(FIG. 5) between any two threads;

vi. Values of C between 0.100 inch and 0.250 inch should be good for most mine conveyor systems but this is an arbitrary choice;

vii. The wall of sleeve 20 is kept as thin as is practical so as to save on material. A thick wall makes for a more rigid sleeve which is easier to slip onto the steel shell because it has less tendency to collapse when forced over the steel. The adhesive cement is applied to the steel shell just before the sleeve 20 is slipped-on.

An embodiment of the invention has been described and design data given for a number of typical designs. This specification will be concluded with a brief discussion of several of the most important factors involved. The first two factors are concerned with form or shape:

i. The outer surfaces of the ribs 22 which form the instantaneous support points for the belt 10 must be in the form of a helix so as to create a relative motion laterally between belt and support points. The degree of relative motion is directly proportional to the lead of the helical or spiral ribs 22 which for a single spiral or helix is equal to the pitch (P) and for a double spiral or helix is equal to 2P;

ii. The helical grooves 28a, 28b formed between the spiral ribs 22 should be continuous and un-obstructed. Hence the mid-length groove 26 that divides the two opposed helical or spiral ribs must be at least as deep as the helical grooves 28a, 28b.

The remaining three factors could be termed design features:

i. Experience to date suggests that one of the most important features of design is the ratio of rib height to base of thread width (H/B) which will determine the flexibility of the spiral rib 22. Values $1 \leq H/B < 3$ are recommended when C is between 0.1 inch and 0.25 inch;

ii. Secondly, the lead angle $\alpha$ of the spiral rib 22 should be less than 5°. However, this could be exceeded if the conveyor system has reserve power to meet the minor power demand increase due to increased frictional forces;

iii. Fully cured polyurethane elastomer in the hardness range 60A to 55D (preferably 85A-55D) is the preferred material of construction. Other similar materials can be used but they should provide flexibility and abrasion resistance equivalent to the above.

Specific embodiments of the invention have been described, not by way of limitation but by way of illustration. The scope of the invention may be determined by reference to the following claims.

I claim:

1. An idler roll covering for use in belt conveyor systems comprising a cylindrical sleeve of a flexible abrasion resistant material, said sleeve having thereon at least first and second outwardly projecting ribs integrally formed with said sleeve, said first and second ribs having respective inner ends located adjacent the midlength portion of the sleeve and said ribs spiralling around said sleeve a plurality of times in the form of continuous spirals or helices towards opposing respective ends of the sleeve with the spiral or helix defined by the first one of said ribs being of opposite hand to the second one, first and second helical grooves being defined by the first and second spiral ribs respectively, said inner ends of said first and second ribs being spaced from one another at said mid-length portion of the sleeve, said ribs being dimensioned and proportioned in cross section such that when outer portions or crests of said ribs rollingly engage a surface of a loaded moving conveyor belt, the spiral or helical ribs are deflected and released in continuous cyclic fashion thereby tending to shake loose sticky particles and also tending to cause any particles in the grooves to be moved therealong, either toward the opposing ends of the sleeve or toward said mid-length portion of the sleeve, depending on the direction of rotation, whereby to permit said particles to escape from between said ribs.

2. An idler roll covering according to claim 1 wherein said inner ends of the opposing spiral ribs are separated by a divider groove extending around the sleeve and having a depth at least as great as that of the helical grooves between the spiral ribs whereby to facilitate the escape of said accumulations from between said ribs.

3. An idler roll covering according to claim 1 wherein each said rib is of inverted V shape with a generally rounded crest.

4. An idler roll according to claim 3 wherein each rib has a crest width from about 0.1 inch to about 0.25 inch with the ratio of the rib height H to the width of the rib at its base B being such that $1 \leq H/B < 3$.

5. An idler roll covering according to claim 3 wherein said covering is made from a fully cured polyurethane elastomer.

6. An idler roll covering according to claim 4 wherein said covering is made from an elastomer having a Shore hardness from 60A to about 55D.

7. An idler roll for use in belt conveyor systems, said roll having a surface defined by first and second outwardly projecting ribs of a flexible abrasion resistant material, said first and second ribs having respective inner ends located adjacent the mid-length portion of the roll and said ribs spiralling around said roll a plurality of times in the form of continuous spirals or helices towards opposing respective ends of the roll with the spiral or helix defined by the first one of said ribs being of opposite hand to the second one, first and second helical grooves being defined by the first and second ribs respectively, said inner ends of said first and second ribs being spaced from one another at said mid-length portion of the roll, said ribs being dimensioned and proportioned in cross section such that when outer portions or crests of said ribs rollingly engage a surface of a loaded moving conveyor belt the spiral or helical ribs are deflected and released in continuous cyclic fashion thereby shaking loose sticky particles and also causing the particles to be moved along the grooves and to escape from same at the opposing ends of the roll or toward said mid-length portion of the roll thereby tending to prevent accumulation of the particles between said ribs.

8. An idler roll according to claim 7 wherein the inner ends of the opposing spiral ribs are spaced from one another by a divider groove extending around the roll and having a depth at least as great as that of the helical grooves between the spiral ribs.

9. An idler roll according to claim 7 wherein each rib is of generally inverted V shape with a generally rounded crest.

10. An idler roll according to claim 9 wherein each rib has a crest width from about 0.1 to about 0.25 inch with the ratio of the rib height H to the width of the rib at its base B being such that $1 \leq H/B < 3$.

11. An idler roll according to claim 10 wherein said flexible material comprises a fully cured polyurethane elastomer.

12. An idler roll covering according to claim 11 wherein said material is an elastomer having a Shore hardness from 60A to about 55D.

13. An idler roll covering for use in belt conveyor systems comprising a cylindrical sleeve of a flexible abrasion resistant material, said sleeve having thereon at least first and second outwardly projecting ribs integrally formed with said sleeve, said first and second ribs having respective inner ends separated from one another and located adjacent the mid-length portion of the sleeve and said ribs spiralling around said sleeve a plurality of times in the form of continuous spirals or helices towards opposing respective ends of the sleeve with the spiral or helix defined by the first one of said ribs being of opposite hand to the second one, first and second helical grooves being defined by the first and second spiral ribs respectively, said ribs being dimensioned and proportioned in cross section such that when outer portions or crests of said ribs rollingly engage a surface of a loaded moving conveyor belt, the spiral or helical ribs are deflected and released in continuous cyclic fashion thereby tending to shake loose sticky particles and also tending to cause any particles in the grooves to be moved therealong.

* * * * *